United States Patent [19]
Fisher

[11] 3,921,261

[45] Nov. 25, 1975

[54] FASTENER

[75] Inventor: Julian Vernon Fisher, Carpentersville, Ill.

[73] Assignee: Illinois Tool Works Inc., Chicago, Ill.

[22] Filed: Nov. 18, 1974

[21] Appl. No.: 525,001

[52] U.S. Cl. ............... 24/221 R; 24/73 SM; 85/80
[51] Int. Cl.² ...................... A44B 21/00; F16B 13/06
[58] Field of Search ............ 24/73 P, 73 PF, 221 A, 24/208 A, 221 R, 221 L, 73 AP, 73 SM, 73 RM, 73 PM; 85/5 R, 80; 248/220.5, 239

[56] References Cited
UNITED STATES PATENTS

| 2,596,332 | 5/1952 | Flora et al. ...................... 24/221 L X |
| 2,836,215 | 5/1958 | Rapata ................................... 85/80 |
| 2,940,558 | 6/1960 | Schlueter ...................... 24/221 L X |
| 3,180,606 | 4/1965 | Sabin et al. .......................... 248/239 |
| 3,220,078 | 11/1965 | Preziosi ............................ 24/221 L |
| 3,742,309 | 6/1973 | Sterner ........................... 24/73 P X |
| 3,803,973 | 4/1974 | Rapata ........................... 24/73 PF X |

FOREIGN PATENTS OR APPLICATIONS

| 158,334 | 8/1954 | Australia ............................ 248/239 |
| 1,380,227 | 10/1964 | France .............................. 24/73 PF |
| 937,220 | 9/1963 | United Kingdom .............. 24/73 AP |
| 1,020,694 | 2/1966 | United Kingdom .............. 24/73 AP |

OTHER PUBLICATIONS

I.B.M. Technical Disclosure Bulletin, Vol. 15, No. 12, May 1973.

*Primary Examiner*—Donald A. Griffin
*Attorney, Agent, or Firm*—Olson, Trexler, Wolters, Bushnell & Fosse, Ltd.

[57] ABSTRACT

A fastener is disclosed which can be attached to a wall defining a polygonal aperture. A fastener face is adapted to abut a wall face near the aperture. A base element extends from the face to extend into the hole and abut opposed sides and corners of the hole. A shank comprises opposed planar surfaces oriented parallel to one another. Each surface is joined to the fasteners by a central stem, thereby defining two undercut shoulders on each face. At least part of the unflexed shoulder is spaced from the fastener face by a distance equal to or less than the hole thickness so as to secure the fastener in the hole.

13 Claims, 34 Drawing Figures

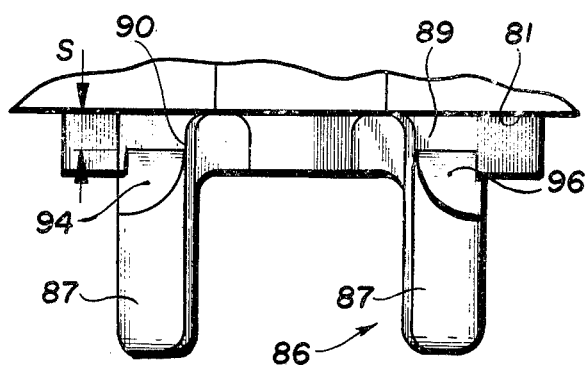
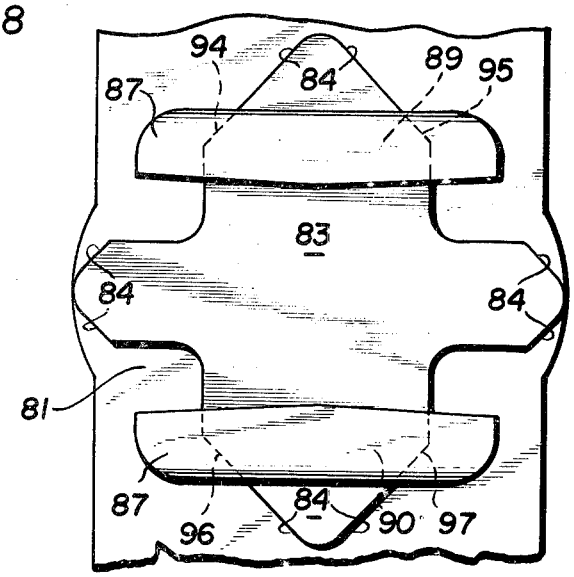
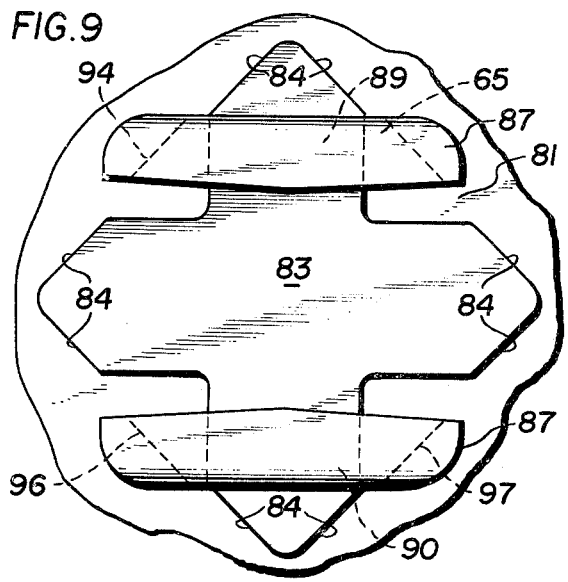
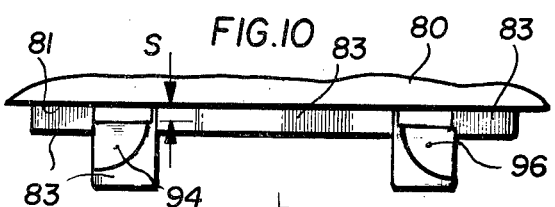
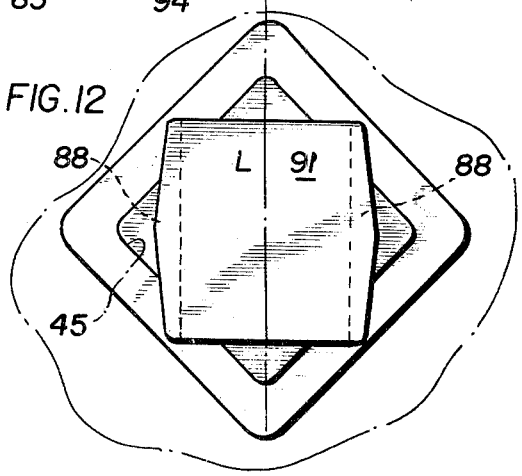
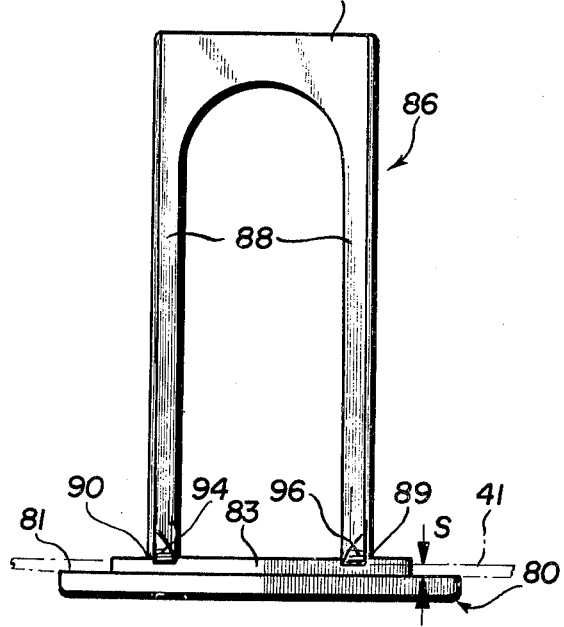
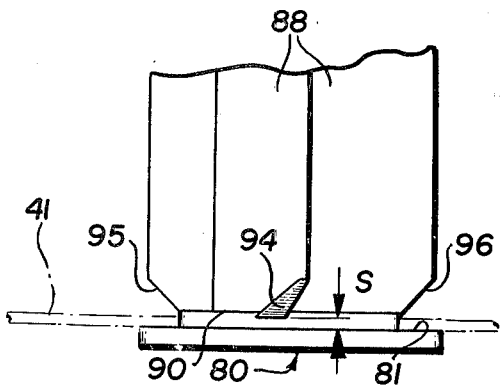

FASTENER

BACKGROUND OF THE INVENTION

This invention relates generally to fastener devices, and more particularly concerns a one-piece fastener which can be attached to an apertured wall without special tools and where access to only one side of the wall need be available.

Inexpensive fastener members formed of low-cost material such as plastics or metal are being increasingly demanded by manufacturers and assemblers of a wide variety of products. Highly desirable are those fasteners which can be quickly, easily and securely installed without the use of special tools or without requiring extensive personnel training. Successful fasteners of this type are disclosed in U.S. Pat. Nos. 3,443,783 and 3,826,458.

It is the general object of the present invention to provide a low cost, reliable, secure, single piece fastener which can be quickly attached to an apertured wall without the use of special tools and which requires access to only one side of the wall.

It is a more specific object of the invention to provide such a fastener at low end-item cost. It is a related object to provide a fastener which minimizes the requirements for non-essential product material.

Another object is to provide, in one embodiment of the invention, a fastener which can be molded from thermoplastic or similar material in a relatively inexpensive mold, such as a two-plate mold. In an alternative embodiment, the invention can be provided in metallic form, wherein the metal fastener can be inexpensively stamped or otherwise formed from a single piece of common sheet metal.

It is yet another object of the invention to provide such a fastener which can be rigidly secured to the apertured wall, and which will effectively resist unintentional or unauthorized removal therefrom.

Still another object is to provide such a fastener in such form as will maximize attachment security, yet minimize part cost.

Other objects and advantages of the invention will become apparent upon reading the following detailed description and upon reference to the drawings. Throughout the description, like reference numerals refer to like parts.

BRIEF DESCRIPTION OF THE DRAWINGS

FIG. 7 is a fragmentary front elevational view similar to FIG. 6, but showing fastener parts of an alternate or second major embodiment of the invention;

FIG. 8 is a plan view of the bottom of the fastener shown in FIGS. 6 and 7;

FIG. 9 is a plan view of the fastener bottom similar to FIG. 8 but showing a slightly modified version of the second embodiment of the invention;

FIG. 10 is a fragmentary elevational view similar to FIG. 7 showing in further detail the modified version of this second embodiment of the invention;

FIG. 11 is an elevational view showing yet another or third embodiment of the invention;

FIG. 12 is a top plan view of the fastener shown in FIG. 11;

FIG. 13 is a fragmentary elevational view similar to FIG. 12 but showing the fastener as it appears when located in an intermediate assembly position upon the retaining wall;

DETAILED DESCRIPTION

While the invention will be described in connection with several preferred embodiments and modifications, it will be understood that it is not intended to limit the invention to these embodiments or modifications. On the contrary, it is intended to cover all alternatives, modifications and equivalents as may be included within the spirit and scope of the invention.

Figure 1:
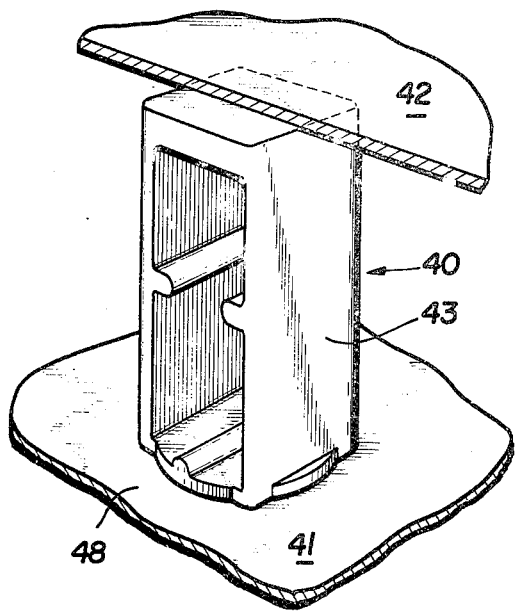
FIG. 1 is a perspective view showing one embodiment of the present invention as it appears when attached to a wall member.
Figure 2:
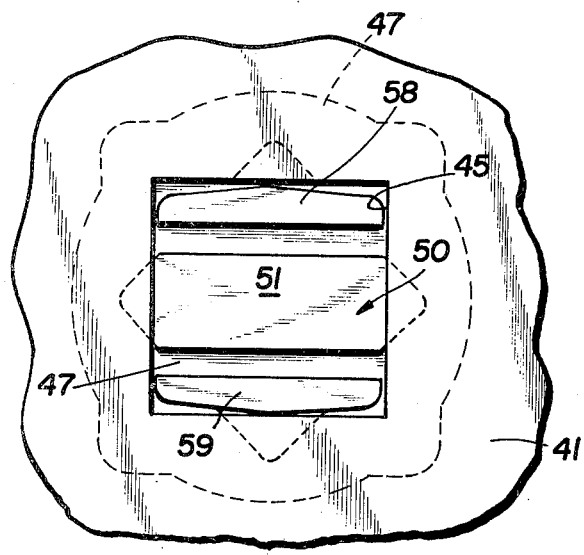
FIG. 2 is a fragmentary bottom plan view of the fastener bottom and the wall member as they appear as the fastener is being preliminarily inserted into a wall aperture.
Figure 3:
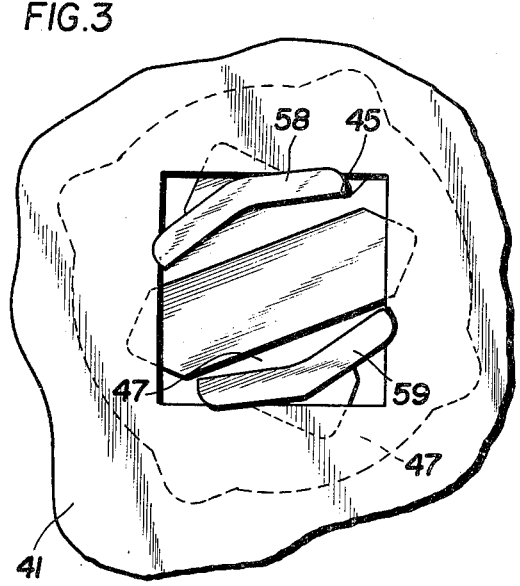
FIG. 3 is a fragmentary bottom plan view similar to FIG. 2 showing the fastener and wall as they appear when the fastener has been inserted into the wall aperture and has been partially rotated into its final position within and upon the wall.

Turning first to FIG. 1, there is shown a fastener 40 embodying the present invention, which can be used to space apart a first wall 41 from another wall 42 by a minimum predetermined distance by a head portion 43. Requirements for such a fastener-spacer can arise, for example, in the assembly of refrigerators wherein inner walls and outer walls are separated by given amounts, and the inter-wall cavity is filled with insulating foam or other material.

As shown in FIGS. 2–6, the wall 41 defines a polygonal hole 45 — here, a substantially square hole — of predetermined size and shape. Since the wall 41 is of predetermined thickness, as shown in FIG. 1, the wall can also be considered to have a predetermined thickness. It will be noted that, in some general respects, this fastener is similar to the devices disclosed in U.S. Pat. Nos. 3,443,783 and 3,826,458.

As shown in FIGS. 2–6, inclusive, the fastener can be considered to generally comprise a planar face 47 which is adapted for abutment against an outer wall face 48.

A second major portion of the fastener comprises a base means 50, which here includes one or more raised land elements 51, 52 and 53 extending from the fastener face 47. In accordance with the invention, these base elements 51–53 are located and shaped to extend into the wall hole 45 and abut opposed sides and corners of the hole as illustrated to prevent translational and rotational movement of the fastener relative to the hole in a direction parallel to the plane of the hole when the base elements are located within the hole.

A third major portion of the fastener comprises a shank 55. Here, this shank 55 includes two planar elements 58 and 59 which are each offset from but parallel to an imaginary line L drawn between non-adjacent corners of the wall hole 45. These generally planar wall members 58 and 59 extend from respective basal ends 60 and 61 outwardly in directions generally perpendicular to the fastener face 47. To permit insertion of these planar elements through the wall hole 45, two outer, opposed, generally planar faces 63 and 64 provided upon the planar elements 58 and 59 respectively are oriented generally parallel to one another but are transversely extended and are spaced perpendicularly apart by amounts less than the distance between corresponding planar sides of the wall hole 45 to permit insertion of the planar elements 58 and 59 through the wall hole.

Figure 4:
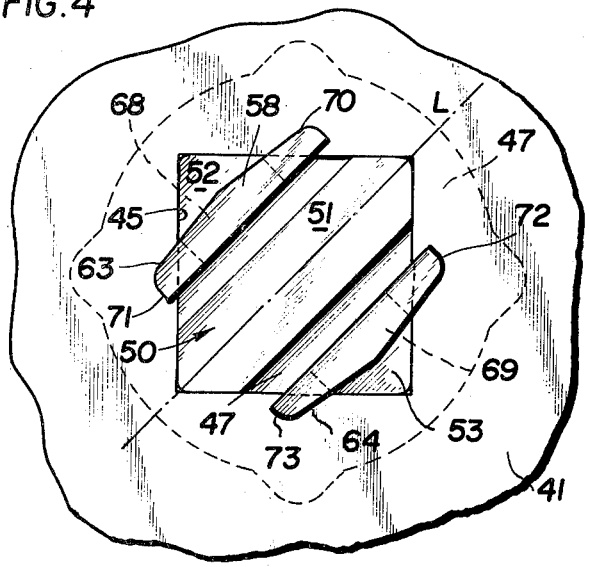
FIG. 4 is a fragmentary bottom plan view similar to FIGS. 2 and 3 showing the fastener and the wall as they appear when the fastener has been finally secured within the wall aperture and upon the wall.
Figure 5:
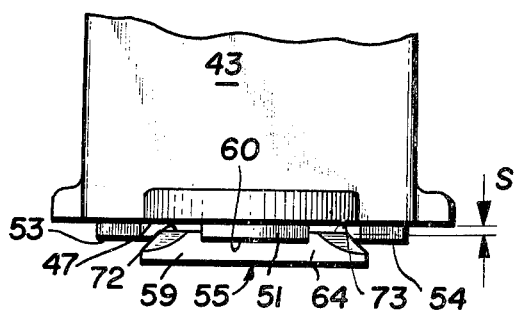
FIG. 5 is a fragmentary side elevational view showing in further detail those parts of the fastener proximate to the wall.
Figure 6:
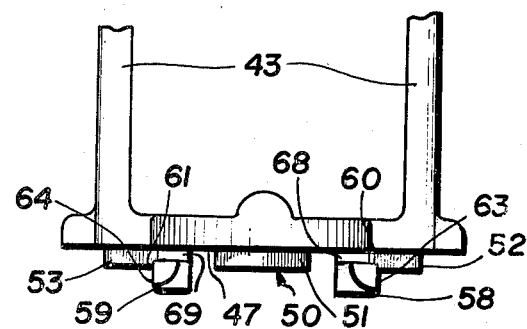
FIG. 6 is a fragmentary front elevational view similar to FIG. 5 and showing in further detail those portions of the fastener which are proximate to the wall.
Figure 14:
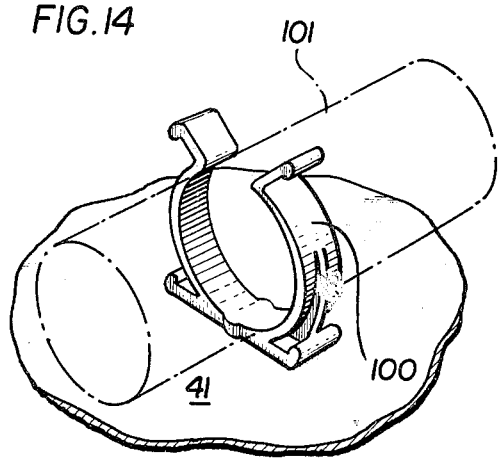
FIG. 14 is a general perspective view of still another fourth embodiment of the invention.
Figure 15:
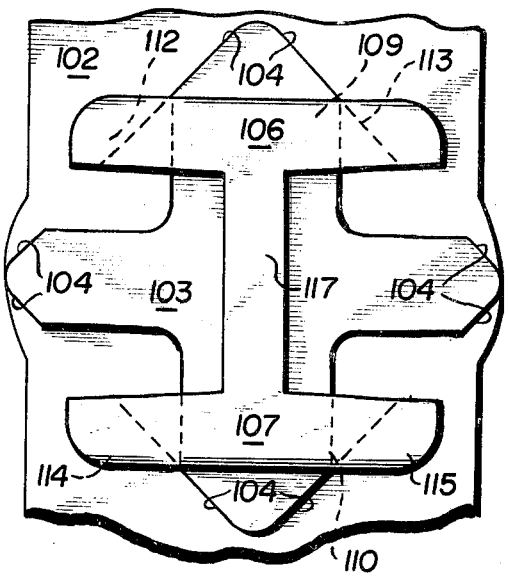
FIG. 15 is a plan view similar to FIG. 8 showing in further detail the bottom of this fourth embodiment of the invention.
Figure 16:
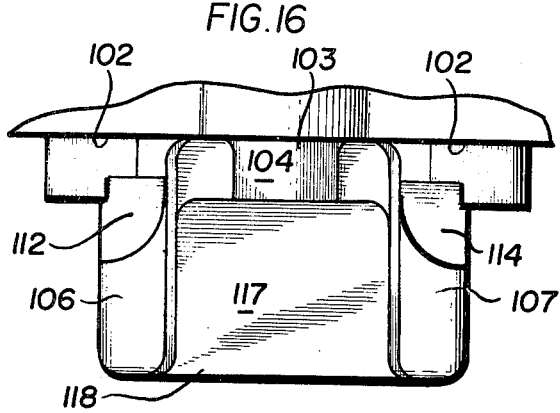
FIG. 16 is a fragmentary front elevational view of the bottom portion of the fastener shown in FIGS. 14 and 15.
Figure 17:
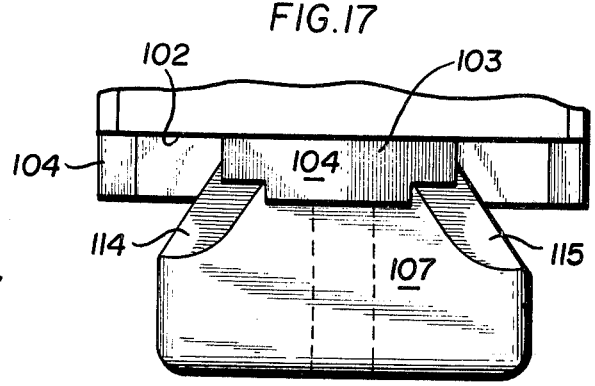
FIG. 17 is a fragmentary side elevational view similar to FIG. 16 of the fourth embodiment of the invention.

As may be envisioned particularly from FIGS. 4 and 6, the planar members 58 and 59 are joined to the fastener at their basal ends 60 and 61 by central stem portions 68 and 69 respectively of reduced transverse dimension in further accordance with the invention. Thus, on each planar member 58 and 59, flexible shoulders 70–73, respectively, are formed which extend away from the stems 68 and 69 in opposite directions. At least part of each unflexed shoulder is spaced from the fastener face by an amount S, as shown in FIG. 5, which is less than the hole thickness, as that thickness is here defined by the thickness of the wall 41, so as to permit the fastener base means 50 to be secured within the hole 45. Further, this reduced distance S permits the fastener planar member stems 68 and 69 to be tensioned in a direction perpendicular to the plane of the hole so as to urge both the fastener face 47 and the planar member shoulders 70–73 into frictional engagement with the wall 41 and prevent movement of the fastener relative to the hole in a direction perpendicular to the plane of the hole. Each planar member 58 and 59 is undercut at its basal end in a transverse direction to form the stems 68 and 69 in a direction perpendicular to the fastener face. This undercut is sized, when measured from the face 47, by an unstressed amount S less than the hole thickness so as to permit the fastener base to be drawn into a hole-side-abutting position in the hole and to tension the fastener. In the illustrated embodiment, the hole 45 is substantially square, and the two opposed planar elements are oriented at angles of substantially 45° to the sides of the square wall holes when the fastener is assembled and finally secured to the walls.

A second and a third embodiment of the invention are shown in FIGS. 7–13, inclusive. Here, the fastener 80 includes a button-type head 81. A reverse face 81 on the fastener head is planar, and is adapted for abutment against those portions of the wall 41 which are adjacent the wall aperture or hole 45. Again, a base member 83 is formed upon the fastener face 81. In accordance with the invention, translational and rotational movement of the fastener relative to the hole 45 in a direction parallel to the plane of the hole is prevented. To accomplish this, the base 83 includes edges 84 which abut opposed sides and corners of the hole 45. In the embodiment of FIG. 7, the shank 86 includes two planar elements 87 which extend outwardly from respective basal ends 89 and 90 in a direction generally perpendicular to the fastener face 81. These planar members 87, like the two planar members 43 in the first embodiment, are oriented offset from but parallel to an imaginary line L drawn between non-adjacent corners of the hole 45. In the embodiment of FIGS. 11–13, planar elements 88 of extended length are joined by a bridge member 91 which lends rigidity to the fastener member and which provides an abutment for locating an adjacent wall (not shown) at a minimum distance from the first wall 41 to which the fastener is securely attached.

Again, each stem 89 and 90, taken together with the planar members provide flexible shoulders 94–97, inclusive. At least part of each unflexed shoulder is spaced from the fastener face by an amount S less than the hole thickness so as to permit the fastener base means to be secured within the hole and to tension the fastener in a direction perpendicular to the plane of the hole 45 so as to prevent movement of the fastener relative to the hole 45 in a direction perpendicular to the plane of the hole.

Again, these planar members — whether they take the form of the embodiment 87 or the slightly modified version 88 — are oriented gradually parallel to one another but are spaced perpendicularly apart and transversely extend amounts less than the distance between corresponding planar sides of the wall hole, so as to permit their insertion through the wall hole for final assembly. In the illustrated embodiment, the hole 45 is substantially square, and the two opposed planar elements are oriented at angles of substantially 45° to the sides of the square wall holes when the fastener is assembled and finally secured to the walls.

A fourth embodiment of the invention is illustrated in FIGS. 14–19. Here, the fastener takes the form of a generally C-shaped clamp 100 adapted to retain an electrical capacitor 101 or the like upon the wall 41. Again, the clamp 100 includes a planar face 102 adapted for abutment against the wall 41, and a base 103 extending from the face 102 and having edges 104 adapted to abut opposed sides and corners of the wall hole to prevent movement of the fastener in a direction parallel to the hole. The fastener shank again includes two planar elements 106 and 107 extending generally perpendicularly to the face 102. Each planar element 106 and 107 is provided, in turn, with a stem 109 or 110 respectively. Together with the planar elements 106 and 107, these stems 109 and 110 define four flexible cammed shoulders 112–115. As described above, these shoulders 112–115 engage the wall 41 and assist in retaining the fastener in its secured location.

Figure 18:
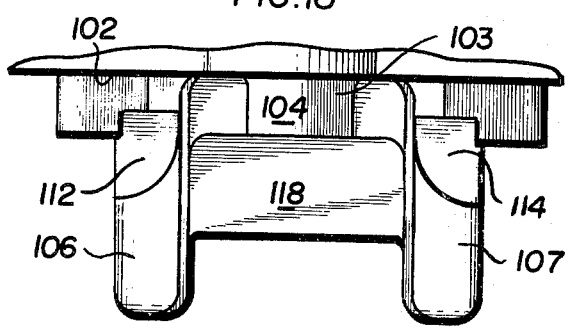
FIG. 18 is a fragmentary front elevational view similar to FIG. 16 showing a slightly modified version of this fourth embodiment of the invention.
Figure 21:
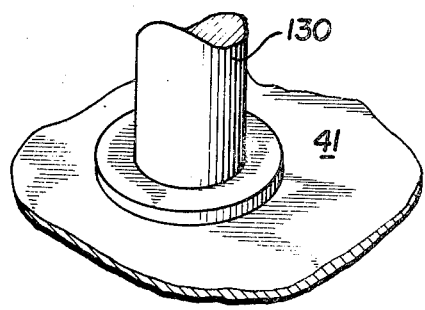
FIG. 21 is a fragmentary perspective view showing, in its general aspect, yet another or fifth embodiment of the invention.
Figure 22:
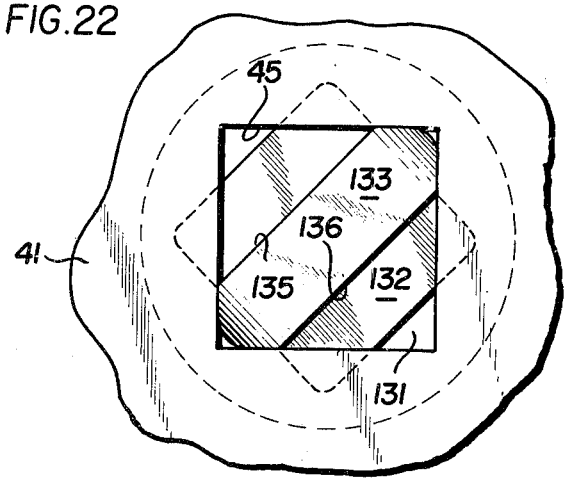
FIG. 22 is a fragmentary bottom plan view similar to FIG. 2 showing the fastener and the apertured wall as they appear when the fastener is being preliminarily inserted into the wall aperture.
Figure 23:
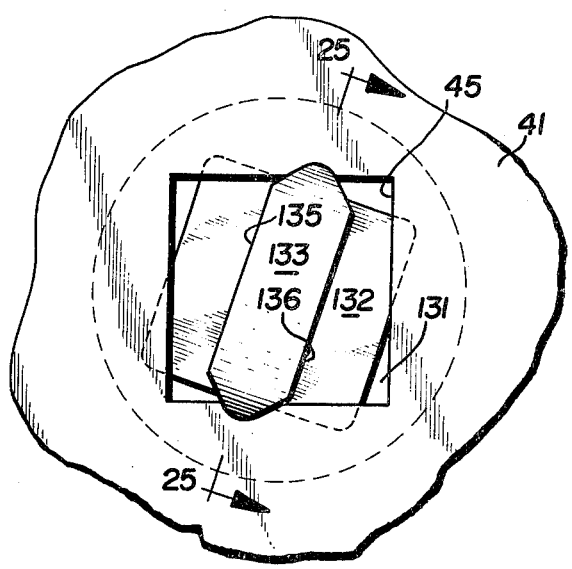
FIG. 23 is a fragmentary bottom plan view similar to FIG. 22 showing the fastener and the apertured wall as they appear when the fastener has been partially inserted into the wall aperture and has been partially rotated into final position within and upon the wall.
Figure 24:
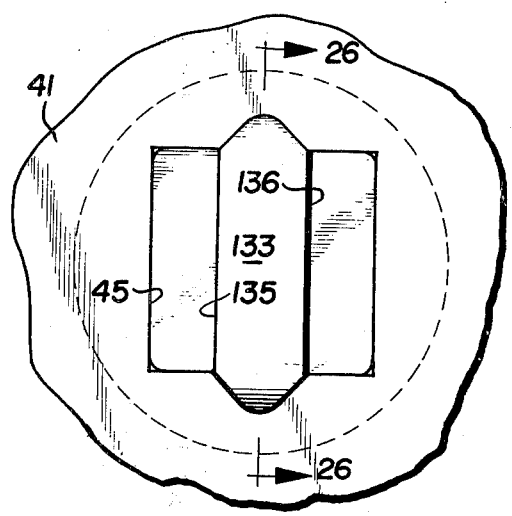
FIG. 24 is a fragmentary bottom plan view similar to FIGS. 22 and 23 showing the fastener and the wall as they appear when the fastener has been finally secured in position within the wall aperture and upon the wall.
Figure 25:
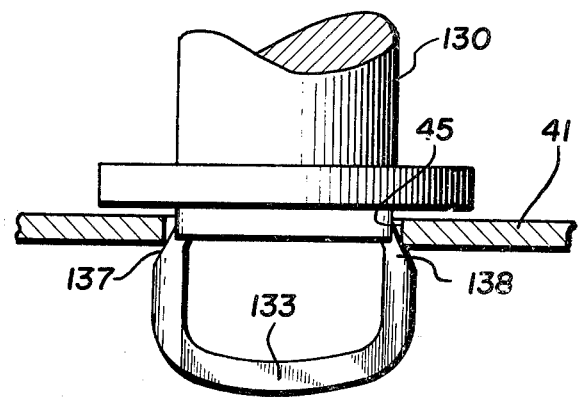
FIG. 25 is a fragmentary sectional view taken substantially in the plane of line 25—25 in FIG. 2 and showing the fastener as it appears in its partially-secured or assembled condition in and on the wall.
Figure 26:
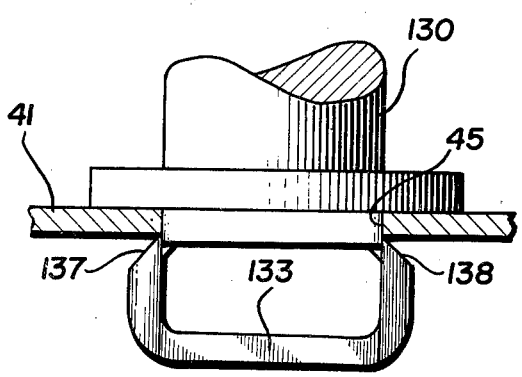
FIG. 26 is a fragmentary sectional view taken substantially in the plane of line 26—26 in FIG. 24 and showing the fastener as it appears in its finally secured position in and on the wall.
Figure 27:
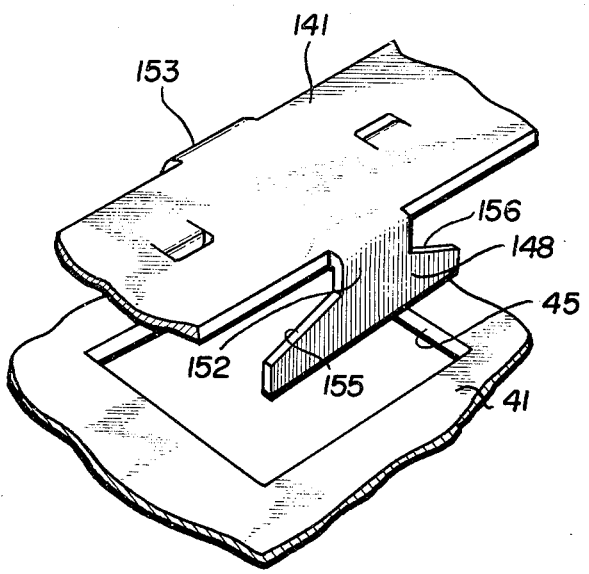
FIG. 27 is a fragmentary perspective view showing an apertured wall and yet another or sixth embodiment of the invention.
Figure 28:
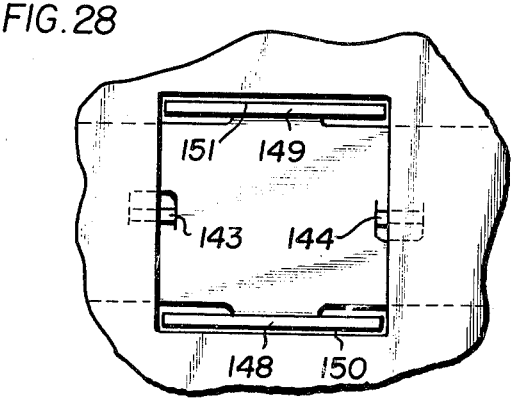
FIG. 28 is a fragmentary bottom plan view of the fastener and the apertured wall similar to FIGS. 2 and 22 and showing the fastener and the wall as they appear as the fastener is being preliminarily inserted into the wall aperture.
Figure 29:
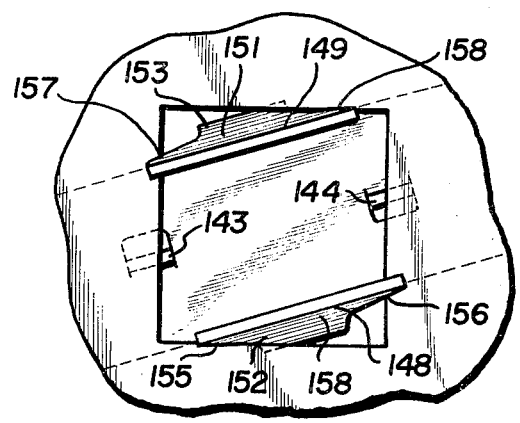
FIG. 29 is a fragmentary bottom plan view of the fastener and the apertured wall similar to FIGS. 3 and 23 showing the fastener and wall as they appear when the fastener has been partially inserted into the wall aperture and has been partially rotated into final position within and upon the wall.

It is a feature of the invention that these planar members 106 and 107 can be relatively rigidly retained in their indicated locations. To this end, a web member 117 extends perpendicularly between the two planar elements 106 and 107 thereby defining a substantially H-shaped head which provides, in accordance with another feature of the invention, a rigid fastener member with minimal raw material requirement. If, on the other hand, it is desired to reduce the amount of material necessary to manufacture the novel fastener, the web 118 can be formed so as to rise to a height less than the perpendicular height of the planar elements 106 and 107, when measured perpendicularly from the fastener face 102, as shown in FIG. 18.

Figure 20:
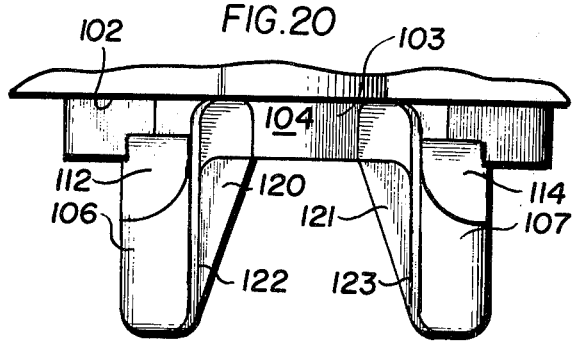
FIG. 20 is a front elevational view similar to FIGS. 16 and 18 and showing in further detail the embodiment of the invention shown in FIG. 19.
Figure 19:
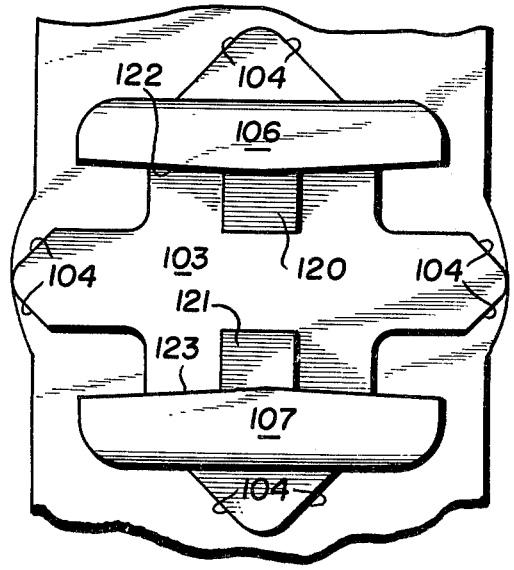
FIG. 19 is a bottom plan view similar to FIG. 15 and showing yet another slightly modified version of this fourth embodiment of the invention.

If slightly greater flexibility in the planar elements 106 and 107 is permissible and further savings in fastener material are desired, inclined gussets 120 and 121 can be provided which extend between respective interior faces 122 and 123 of the respective planar elements 106 and 107 and the base 103, as shown in FIGS. 19 and 20.

Yet another embodiment of the invention is shown in FIGS. 21–26 inclusive. There, the fastener 130, which may have a head taking the form of a right cylinder as shown in FIG. 20, is again attached to the wall 41 which is provided with a substantially square hole 45. In accordance with the invention, a face surface 131 is provided. Extending from the face 131 is a base member 132 which, here, is substantially square and uninterrupted in its periphery or perimeter. However, it is a feature of this embodiment of the invention that but a single planar member 133 extends in a direction generally parallel to an edge of the square base 132. Two opposed planar surfaces 135 and 136 are formed on opposite sides of the single planar member 133. Again, as especially illustrated in FIGS. 25 and 26, these surfaces are undercut to provide shoulders 137 and 138 to assist in retaining the fastener in its designated position upon the wall 41 as described above.

Careful examination of the embodiments of the invention disclosed to this point will reveal that each embodiment is bilaterally symmetrical about an imaginary plane which could be passed through or near the fastener center. Thus, by providing appropriate draft in directions perpendicular to the plane on all surfaces defining the fastener, each fastener can be molded in a two-plate thermoplastic mold. This design thus provides plastic parts so shaped as to permit them to be molded at relatively inexpensive cost. Such design and such molding procedures are, of course, extremely valuable in high-quantity production.

Figure 30:
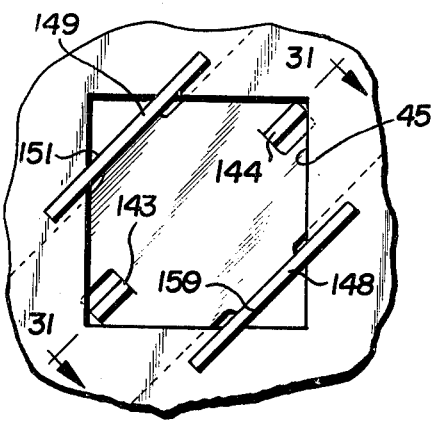
FIG. 30 is a fragmentary bottom plan view similar to FIGS. 4 and 24 showing the wall and the fastener as they appear when the fastener has been finally secured in position within the wall aperture and within the wall.
Figure 32:
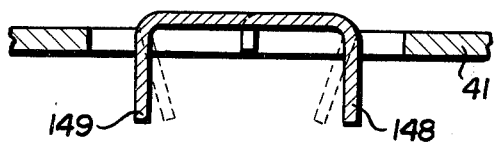
FIG. 32 is a fragmentary sectional view taken substantially in the plane of line 32—32 in FIG. 31 and showing in yet further detail the fastener and the manner in which it may flex during its attachment to the wall.

Yet another embodiment of the invention is shown in FIGS. 27–32 inclusive, this embodiment being formed of sheet metal or similar material. As in the preceeding embodiments, the fastener comprises a planar face 141 adapted for abutment against the face of the wall 41. To prevent translational and rotational movement of the fastener 140 relative to the hole 45 in accordance with the invention, the base means here includes two struck-up tang members 143 and 144 extending above the general plane of the fastener face 141 and located to extend into the wall hole 45 and abut opposed sides and corners of the hole 45 when the fastener is rotated into its final fully fastened position, as shown in FIG. 30.

To tension the fastener and retain it within the hole 45 in further accordance with the invention, the fastener further comprises shank means which here include a pair of planar elements 148 and 149 drawn or partially struck from the fastener material.

Each planar member 148 and 149 has an outer face 150 and 151, respectively, and these faces are oriented generally parallel to one another. Again, to permit insertion of these planar elements through the wall hole 45, the planar faces 150 and 151 transversely extend and are perpendicularly spaced apart by amounts less than the distance between corresponding planar sides of the wall defining the wall hole.

Figure 33:
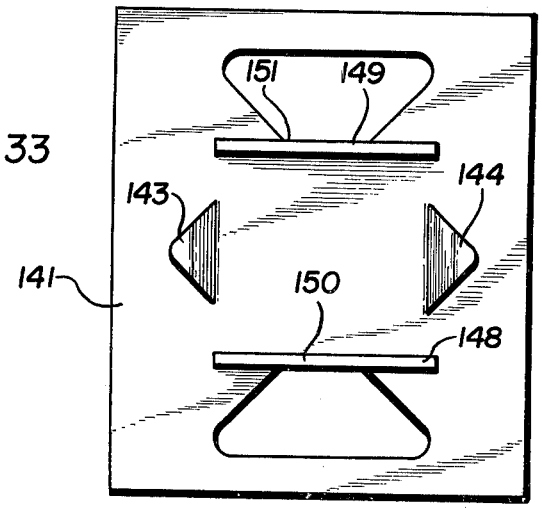
FIG. 33 is a bottom plan view showing a modified version of this sixth embodiment of the invention.
Figure 31:
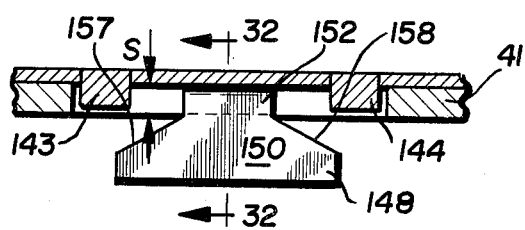
FIG. 31 is a fragmentary sectional view taken substantially in the plane of line 31—31 in FIG. 30 and showing in further detail the fastener and the wall as they appear when the fastener has been finally assembled within and upon the wall.
Figure 34:
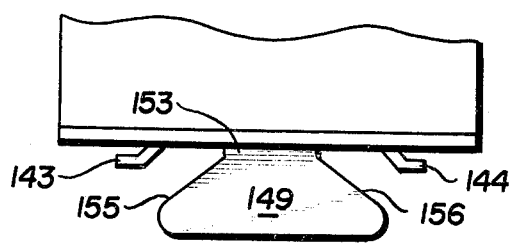
FIG. 34 is a side elevational view showing in still further detail portions of the fastener shown in FIG. 33.

Two reduced dimension stems 152 and 153, respectively, connect the basal ends of each planar member 148 and 149 to the body of the fastener, thereby providing the planar members with flexible shoulders 155–158, respectively. At least part of each unflexed shoulder is spaced from the fastener face by an amount S less than the wall hole thickness so as to permit the fastener base to be secured within the hole and to tension the fastener in a direction perpendicular to the plane of the hole so as to prevent movement of the fastener relative to the hole in a direction perpendicular to the plane of the hole. A slightly modified version is shown in FIGS. 33 and 34, wherein the planar members 148 and 149 are struck from the body of the fastener and the fastener face 141.

It will be recognized that various forms of securing and/or spacing means can be utilized with the fastener head and will extend from the head in a direction opposite its face, many of such means being well known in the art.

In each of the embodiments disclosed, the shank is telescoped into the polygonal wall aperture, with the planar element means thereof being complimentary to opposed edges of the hole, until the base means initially abut the wall face. A partial turn of the fastener results in the deflection of the planar element means until the base means elements become aligned with and clear the edges of the hole whereupon the base means move into the confines of the hole and the deflected planar element means move toward their initial position and overlie portions of the back of the wall.

It will be recognized that the planar element means could be each provided with a single shoulder extending in opposite directions and still provide a fastening function adequate for certain light load applications.

The invention is claimed as follows:

1. A fastener for attachment to a wall having a face and a back, the wall defining a polygonal hole of predetermined size, shape and thickness, the fastener comprising a head having face means adapted for abutment against the wall face, base means including one or more elements extending from the fastener face means and located on the fastener face means to extend into said wall hole and abut opposed sides adjacent corners of said hole to prevent translational and rotational movement of the fastener relative to the hole in a direction parallel to the plane of said hole, the fastener further comprising shank means including planar element means extending from a basal end outwardly in a direction generally perpendicularly to the fastener face, and having two opposed planar faces oriented generally parallel to one another but transversely extending and being spaced perpendicularly apart by amounts less than the distance between corresponding planar sides defining the wall hole to permit insertion of the planar element through the wall hole, each planar face being joined to the fastener by a central stem portion of reduced transverse dimension, thereby providing at least one flexible shoulder extending in opposite directions, at least part of the unflexed shoulder being spaced from the fastener face by a distance equal to or less than the hole thickness so as to permit the fastener base means to be positioned within the hole and to secure the fastener in a direction perpendicular to the plane of the hole so as to prevent movement of the fastener relative to the hole in a direction perpendicular to the plane of the hole.

2. A fastener according to claim 1, wherein said shank means includes two planar elements each offset from but parallel to an imaginary line drawn between non-adjacent corners of said polygonal wall hole.

3. A fastener according to claim 2 including a web member extending between said two planar elements, said planar elements and said web extending to a substantially common height above said fastener face.

4. A fastener according to claim 2 including a web member extending perpendicularly between said two planar elements but rising to a height less than the perpendicular height of said planar elements measured perpendicularly from said fastener face.

5. A fastener according to claim 2 including at least one gusset extending between an interior face of said planar element and said fastener base means for reinforcing said planar elements.

6. A fastener according to claim 2, wherein said two planar elements extend outwardly a predetermined distance and terminate in a common abutment surface for spacing said hole-defining wall from another wall by a minimum predetermined distance.

7. A fastener for attachment to a wall having a face and a back, the wall defining a square hole of predetermined size and thickness, the fastener comprising a head having planar face means adapted for abutment against the wall face, base means including one or more elements extending from the fastener face means and located on the fastener face means to extend into said square wall hole adjacent abut opposed sides and corners of said hole to prevent translational and rotational movement of the fastener relative to the hole in a direction parallel to the plane of said hole, the fastener further comprising shank means including planar element means extending from a basal end outwardly in a direction generally perpendicular to the fastener face, and having two opposed planar faces oriented generally parallel to one another but transversely extending and being spaced laterally apart by an amount equal to or less than the distance between corresponding planar sides defining the wall hole to permit insertion of the planar element means through the wall hole, each planar face being undercut at its basal end in a transverse direction thereby providing cam surfaces extending in a direction in opposition to the fastener face and spaced from the face by an unstressed amount equal to or less than the hole thickness so as to permit the fastener base means to be drawn into a hole-side-abutting position in the hole by said cam surface, and to secure the fastener in a direction perpendicular to the plane of the hole so as to prevent movement of the fastener relative to the hole in a direction perpendicular to the plane of the hole.

8. A fastener according to claim 7, wherein said base means substantially fills said square hole.

9. A fastener according to claim 7, wherein said two opposed planar faces are oriented at an angle of substantially 45° to the sides of said square wall hole.

10. A fastener according to claim 7, wherein said head means includes two planar elements parallel to each other and oriented at substantially 45° to the sides of said square wall hole.

11. A fastener according to claim 10, wherein said two planar elements are offset from but are oriented substantially parallel to a diagonal of said square hole when said fastener is secured with and upon said wall.

12. A fastener according to claim 11 including a web member extending substantially perpendicularly between said two planar elements, thereby defining a substantially H-shaped fastener head.

13. A fastener according to claim 10 which is formed of molded thermoplastic material, the draft of all surfaces defining said fastener being such that said part can be molded in a two-plate mold.

* * * * *

UNITED STATES PATENT OFFICE
CERTIFICATE OF CORRECTION

Patent No. 3,921,261　　　　　　　Dated November 25, 1975

Inventor(s) JULIAN VERNON FISHER

It is certified that error appears in the above-identified patent and that said Letters Patent are hereby corrected as shown below:

Col. 5, line 23, "gradually" should be --generally--

Col. 8, line 22, "adjacent" should be --and--

Col. 8, line 22, "and" should be --adjacent--

Signed and Sealed this twenty-third Day of March 1976

[SEAL]

Attest:

RUTH C. MASON
*Attesting Officer*

C. MARSHALL DANN
*Commissioner of Patents and Trademarks*